(12) United States Patent
Cordell et al.

(10) Patent No.: US 9,805,030 B2
(45) Date of Patent: *Oct. 31, 2017

(54) CONFIGURATION FOR DYNAMICALLY DISPLAYING LANGUAGE INTERPRETATION/TRANSLATION MODALITIES

(71) Applicant: Language Line Services, Inc., Monterey, CA (US)

(72) Inventors: Jeffrey Cordell, Carmel, CA (US); James Boutcher, Carmel, CA (US); Lindsay D'Penha, Carmel, CA (US)

(73) Assignee: Language Line Services, Inc., Monterey, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/003,743

(22) Filed: Jan. 21, 2016

(65) Prior Publication Data

US 2017/0212885 A1    Jul. 27, 2017

(51) Int. Cl.
| | |
|---|---|
| H04L 29/00 | (2006.01) |
| G06F 17/00 | (2006.01) |
| G06F 3/00 | (2006.01) |
| G06F 17/28 | (2006.01) |
| G06F 3/0484 | (2013.01) |
| G06F 17/30 | (2006.01) |

(52) U.S. Cl.
CPC ........ *G06F 17/289* (2013.01); *G06F 3/04842* (2013.01); *G06F 17/30058* (2013.01)

(58) Field of Classification Search
CPC ............ G06F 17/289; G06F 17/30058; G06F 3/04842
See application file for complete search history.

(56) References Cited

U.S. PATENT DOCUMENTS

| | | | | |
|---|---|---|---|---|
| 6,262,749 | B1 * | 7/2001 | Finger ................. | G01S 7/52023 128/916 |
| 7,017,151 | B1 * | 3/2006 | Lopez ....................... | G06F 8/67 717/111 |
| 7,117,152 | B1 * | 10/2006 | Mukherji ................ | G10L 15/26 704/209 |
| 9,031,828 | B2 * | 5/2015 | Leydon ................ | G06F 17/289 704/10 |
| 2001/0044726 | A1 * | 11/2001 | Li ....................... | H04N 5/44543 704/277 |

(Continued)

*Primary Examiner* — Fariba Sirjani
(74) *Attorney, Agent, or Firm* — Patent Ingenuity, P.C.; Samuel K. Simpson (57) ABSTRACT

A computer implemented language interpretation/translation platform is provided. The computer implemented language interpretation/translation platform comprises a processor that determines available languages for which language interpretation/translation resources are currently available based on at least one user criterion and language interpreter/translator availability. Further, the computer implemented language interpretation/translation platform comprises a routing engine that receives, via an Application Programming Interface, a request for the available languages and sends the available languages to the computing device such that the computing device displays the available languages. The request includes the at least one user criterion.

16 Claims, 6 Drawing Sheets

(56) References Cited

U.S. PATENT DOCUMENTS

| | | | |
|---|---|---|---|
| 2002/0080186 A1* | 6/2002 | Frederiksen | G06F 3/0362 715/808 |
| 2003/0046527 A1* | 3/2003 | Musuchenborn | G06F 3/0481 713/1 |
| 2004/0184461 A1* | 9/2004 | Forssell | H04L 12/2854 370/395.2 |
| 2004/0193441 A1* | 9/2004 | Altieri | G06Q 30/02 709/203 |
| 2005/0071746 A1* | 3/2005 | Hart | G06F 3/1206 715/200 |
| 2005/0086044 A1* | 4/2005 | Hess | G06F 17/289 704/2 |
| 2006/0026001 A1* | 2/2006 | Bravin | G09B 21/009 704/270.1 |
| 2006/0271349 A1* | 11/2006 | Scanlan | G06F 17/275 704/2 |
| 2007/0244688 A1* | 10/2007 | Bangalore | G06F 17/289 704/3 |
| 2008/0201468 A1* | 8/2008 | Titus | H04L 29/06 709/224 |
| 2008/0205626 A1* | 8/2008 | Mandalia | H04M 3/5191 379/265.09 |
| 2009/0204389 A1* | 8/2009 | Wang | G06F 17/289 704/7 |
| 2010/0004918 A1* | 1/2010 | Lee | G06F 17/289 704/3 |
| 2010/0223048 A1* | 9/2010 | Lauder | G06F 17/2836 704/4 |
| 2010/0265397 A1* | 10/2010 | Dasher | G06F 17/289 348/468 |
| 2012/0035907 A1* | 2/2012 | Lebeau | G06F 17/28 704/2 |
| 2012/0116751 A1* | 5/2012 | Bernardini | G06F 17/289 704/3 |
| 2012/0310997 A1* | 12/2012 | Delucchi | G06F 9/4448 707/811 |
| 2013/0030789 A1* | 1/2013 | Dalce | G06F 17/289 704/2 |
| 2013/0085881 A1* | 4/2013 | Chary | G06Q 30/02 705/26.1 |
| 2013/0159968 A1* | 6/2013 | Jazdzewski | G06F 8/43 717/114 |
| 2013/0317871 A1* | 11/2013 | Kulkarni | G06Q 10/06311 705/7.14 |
| 2014/0058718 A1* | 2/2014 | Kunchukuttan | G06F 17/2836 704/2 |
| 2014/0081618 A1* | 3/2014 | Kim | G06F 17/289 704/2 |
| 2014/0180670 A1* | 6/2014 | Osipova | G06F 17/276 704/3 |
| 2014/0195218 A1* | 7/2014 | Takaoka | G06F 17/289 704/2 |
| 2014/0201631 A1* | 7/2014 | Pornprasitsakul | G06F 3/0484 715/716 |
| 2014/0244520 A1* | 8/2014 | Wurtele | G06Q 30/02 705/310 |
| 2014/0269755 A1* | 9/2014 | Veiga | H04L 49/9005 370/429 |
| 2014/0278342 A1* | 9/2014 | Shoshan | G06F 17/289 704/2 |
| 2014/0298193 A1* | 10/2014 | Kiss | G06F 3/0484 715/744 |
| 2014/0303956 A1* | 10/2014 | Wilson | G06Q 10/06 704/2 |
| 2014/0317301 A1* | 10/2014 | Kiet | H04L 67/141 709/227 |
| 2015/0032440 A1* | 1/2015 | Hale | G06F 17/289 704/3 |
| 2015/0057994 A1* | 2/2015 | Fang | G09B 5/125 704/4 |
| 2015/0161115 A1* | 6/2015 | Cuthbert | G06F 17/2836 704/2 |
| 2015/0163811 A1* | 6/2015 | Konstantinou | H04W 76/026 370/329 |
| 2015/0220864 A1* | 8/2015 | Karande | G06Q 10/06311 705/7.13 |
| 2016/0019205 A1* | 1/2016 | Kidwai | G06F 17/2836 704/7 |
| 2016/0085746 A1* | 3/2016 | Ni | G06F 17/2845 704/2 |
| 2016/0117628 A1* | 4/2016 | Brophy | G06F 17/2854 704/2 |
| 2016/0203126 A1* | 7/2016 | Zhu | G06F 17/289 704/3 |
| 2016/0301736 A1* | 10/2016 | Cesena, Jr. | H04L 67/025 |
| 2016/0342587 A1* | 11/2016 | Bastide | G06F 17/2809 |
| 2017/0212885 A1* | 7/2017 | Cordell | G06F 17/289 |

* cited by examiner

CONFIGURATION FOR DYNAMICALLY DISPLAYING LANGUAGE INTERPRETATION/TRANSLATION MODALITIES

BACKGROUND

1. Field

This disclosure generally relates to the field of language interpretation/translation. More particularly, the disclosure relates to computer implemented language interpretation/translation platforms that provide language interpretation/translation services.

2. General Background

A variety of computer implemented language interpretation/translation platforms, which shall be referred to as language interpretation/translation platforms, may be utilized to receive requests for language interpretation/translations services. Such language interpretation/translation platforms may also provide or provide access to language interpretation/translations services.

Users often do not have enough information to decide on which particular type of language interpretation product and/or service to select from. For example, the availability of the various language interpretation products and/or services often rapidly changes such that a user may select a language interpretation product and/or service that is not available anymore at the time of the user request. As a result, a user may select a language interpretation product and/or service that does not provide an optimal solution for the user's language interpretation requirements.

SUMMARY

A computer implemented language interpretation/translation platform is provided. The computer implemented language interpretation/translation platform comprises a processor that determines available languages for which language interpretation/translation resources are currently available based on at least one user criterion and language interpreter/translator availability. Further, the computer implemented language interpretation/translation platform comprises a routing engine that receives, via an Application Programming Interface, a request for the available languages and sends the available languages to the computing device such that the computing device displays the available languages. The request includes the at least one user criterion.

A computer program product is also provided. The computer program product comprises a non-transitory computer readable storage device having a computer readable program stored thereon. When executed on a computer, the computer readable program causes the computer to determine available languages for which language interpretation/translation resources are currently available based on at least one user criterion and language interpreter/translator availability. Further, when executed on the computer, the computer readable program causes the computer to receive, via an Application Programming Interface, a request for the available languages and sends the available languages to the computing device such that the computing device displays the available languages. The request includes the at least one user criterion.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A computer implemented language interpretation/translation system is provided to dynamically display different language interpretation/translation modalities. A user may utilize a computing device that has a client application that accesses the available modalities for a particular language from the computer implemented language interpretation/translation system. The availability of the modalities for a particular language may be based on language interpreter/translator staffing and availability at a particular instance. The computing device may then dynamically update the display of such available modalities for a user selected language so that the user may determine the available languages and modalities that are currently available to the user. As a result, the user is provided with a more predictable experience.

The computer implemented language interpretation/translation system improves the functionality of a computer by improving the accuracy of products and/or services displayed to the user. In contrast with previous configurations in which a user may have requested a language interpretation/translation product and/or service that was not available according to the user's requirements, the computer implemented language interpretation/translation system provides dynamic updates to the computing device of the user so that the computing device more accurately provides available language interpretation/translation features to the user.

Figure 1:
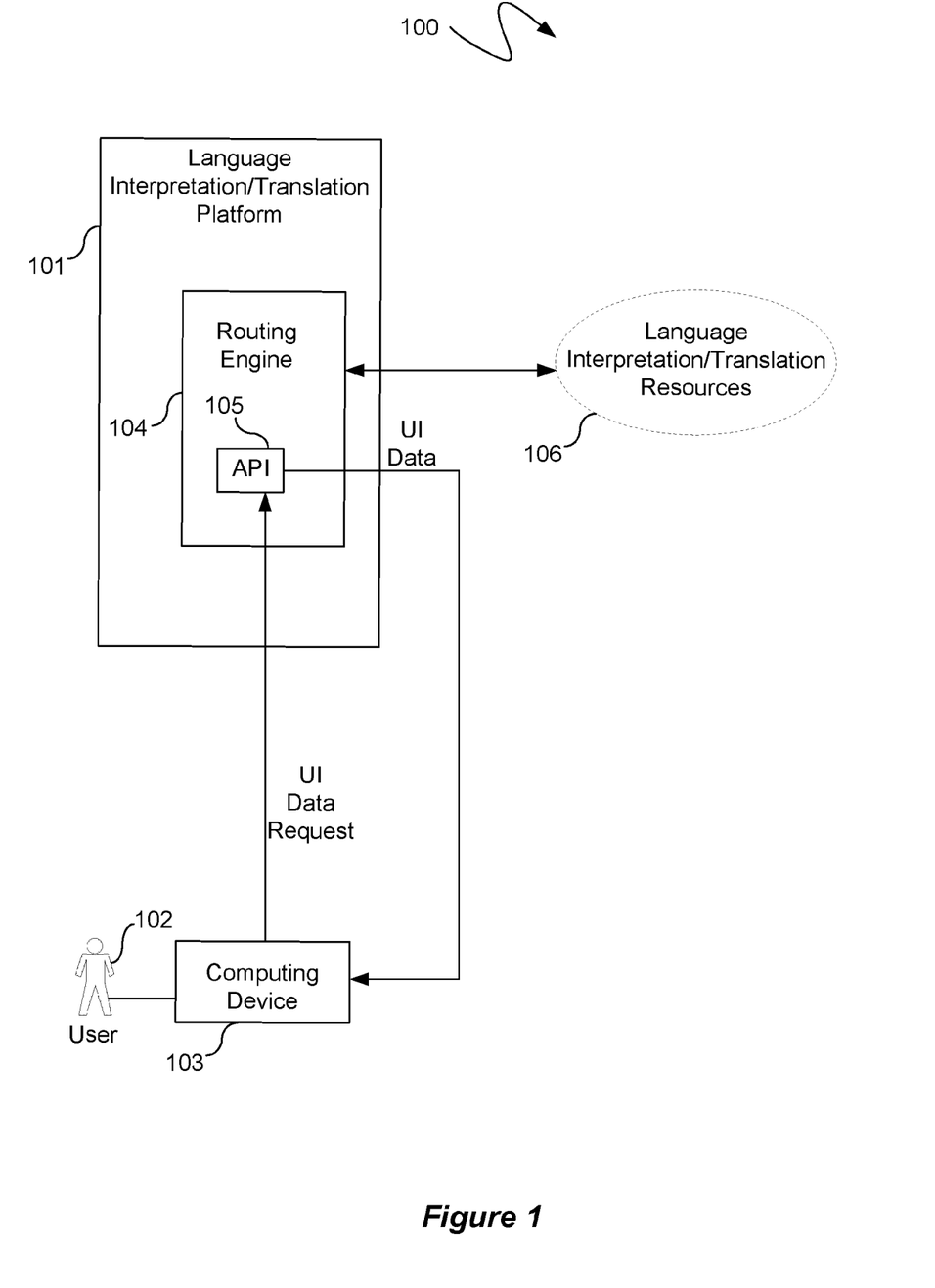
FIG. 1 illustrates a computer implemented language interpretation/translation system.

FIG. 1 illustrates a computer implemented language interpretation/translation system 100. The computer implemented language interpretation/translation system 100 has a language interpretation/translation platform 101 that provides language interpretation/translation products and/or services or access to such products and/or services.

For instance, the language interpretation/translation platform 101 has a routing engine 104 that routes requests for language interpretation/translation products and/or services to corresponding language interpretation/translation resources 106. Further, the routing engine 104 obtains data about the availability of such language interpretation/translation resources 106.

In addition, the language interpretation/translation platform 101 has an Application Programming Interface ("API") 105 that the computing device 103 may call to obtain data about the availability of particular languages and the availability of various modalities, e.g., voice, video, text, etc., for such languages as determined by the routing engine 104 from the language interpretation/translation resources. The computing device 103 may then receive such data for display on a corresponding UI.

In various embodiments, the UI data may be updated upon receiving a user selection. For example, a user selection of a particular language to obtain modality resource availability for that language may result in an update of available languages. In various other embodiments, the UI data may be automatically updated. For example, the computing device 103 may be configured to send UI data requests to for UI data updates at predetermined time intervals, user defined times, etc. As another example, the routing engine 104 may automatically send UI data updates at predetermined time intervals or other preconfigured times to the computing device 103 after receiving a UI data request from the computing device 103.

Figure 2A:
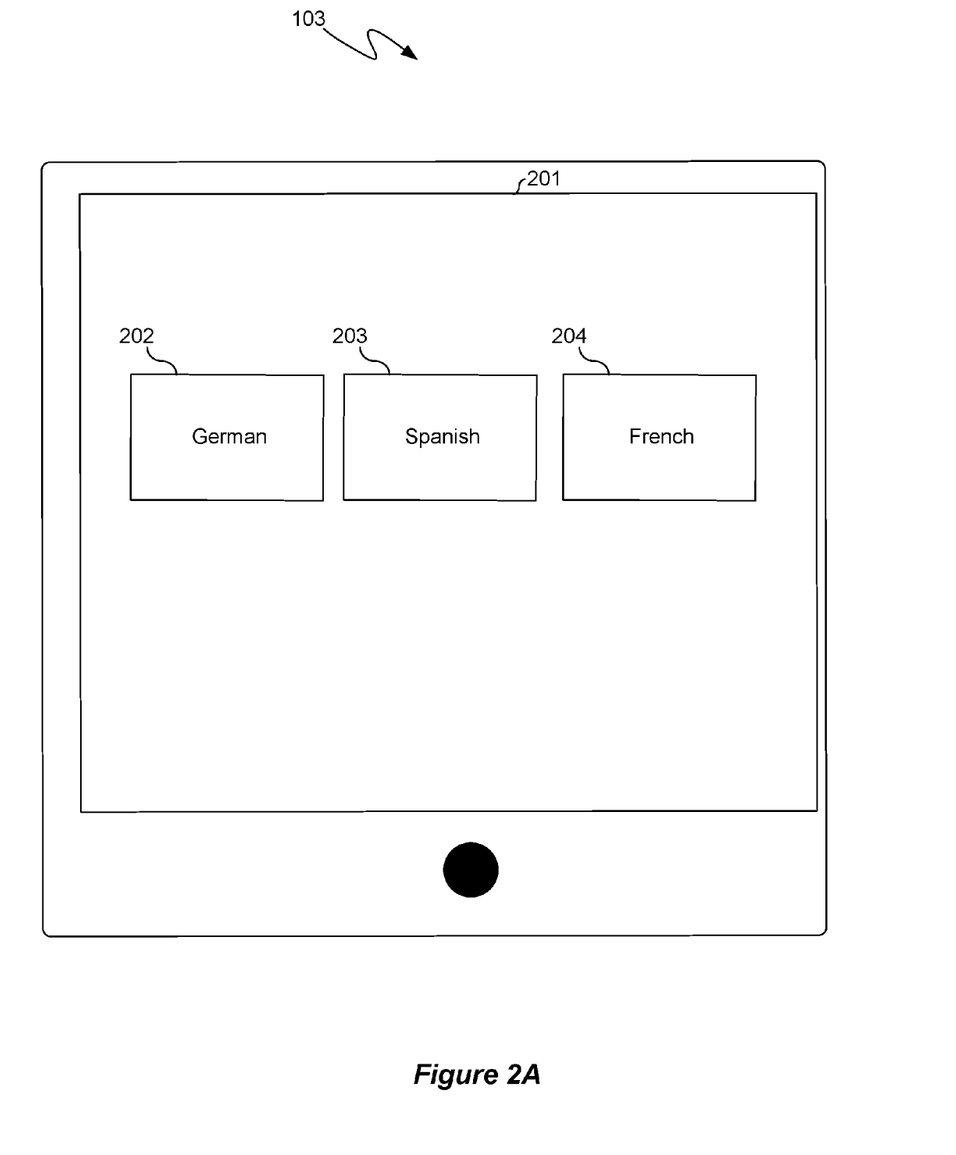
FIG. 2A illustrates an example in which available languages are displayed.
Figure 2B:
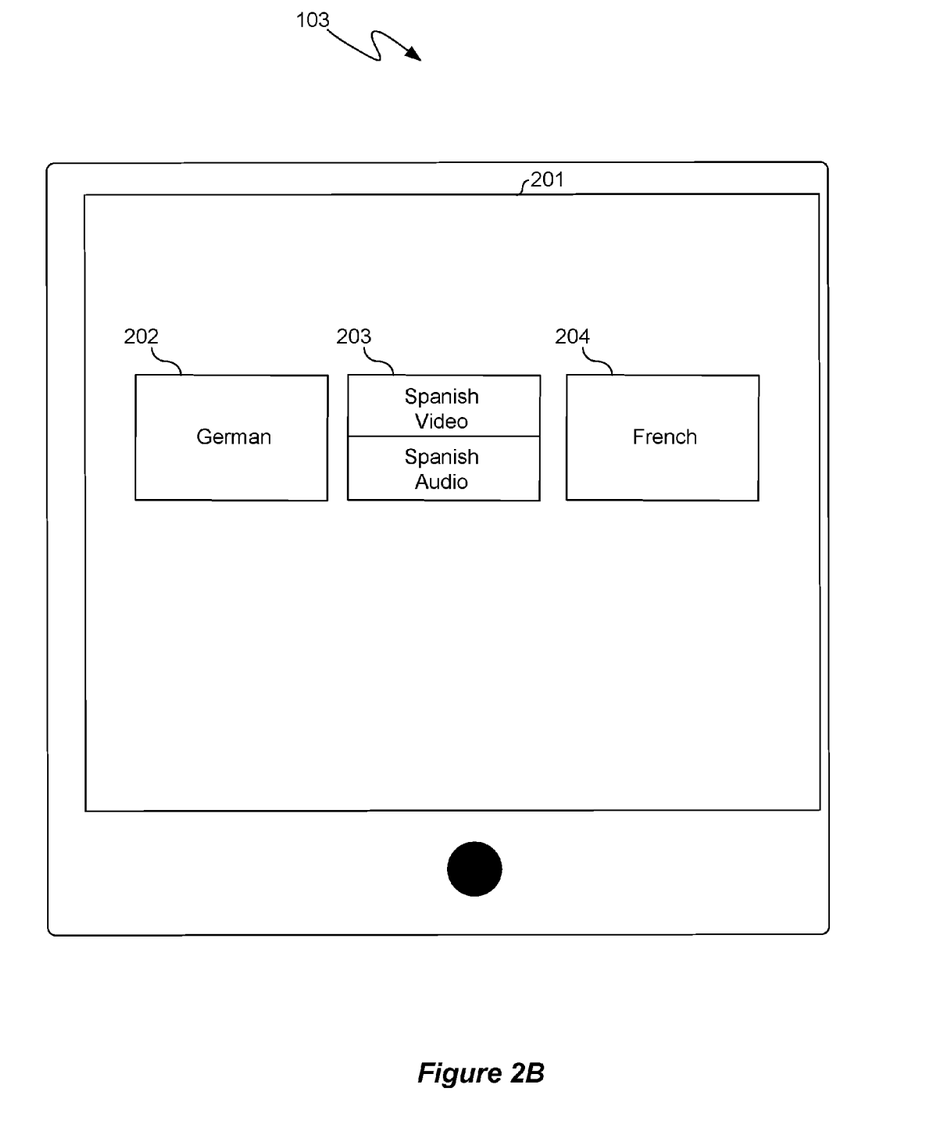
FIG. 2B illustrates another example in which the user selects one of the language indicia illustrated in FIG. 2A.
Figure 2C:
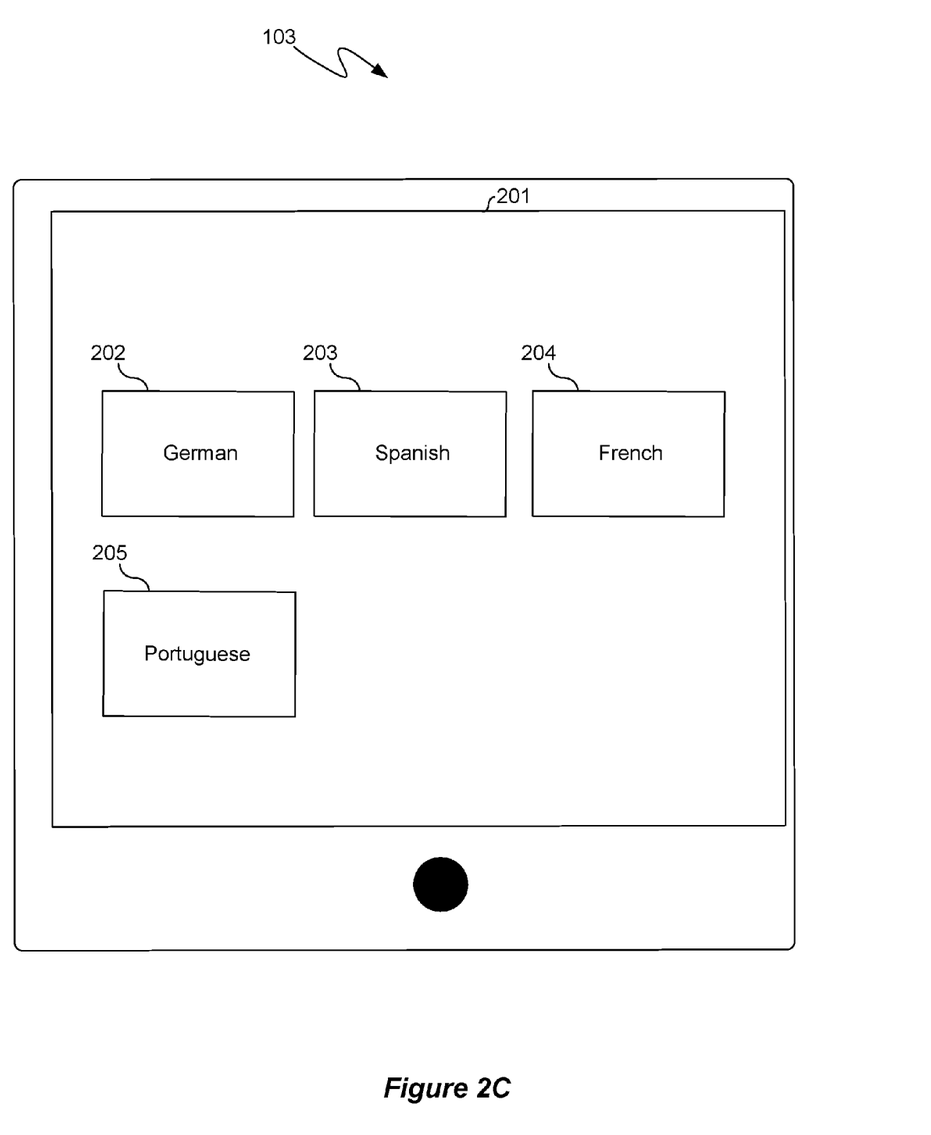
FIG. 2C illustrates an example of an additional language indicium that is automatically received by the computing device via a push notification from the routing engine.

FIGS. 2A-2C illustrate examples of a UI displayed by a display device 201 of the computing device 103 illustrated in FIG. 1. FIG. 2A illustrates an example in which available languages are displayed. For example, the display device 201 may display a UI that illustrates various indicia 202-204 that indicate languages for which language interpretation/translation resources 106 are currently available to provide language interpretation/translation services as determined by the routing engine 104. The computing device 103 displays such data after receiving UI data or dynamically updated UI data from the routing engine 104.

The routing engine 104 may determine the indicia 202-204 only based upon the availability of the language interpretation/translation resources 106, e.g., staffing, network bandwidth, etc. Alternatively, the routing engine 105 may determine the indicia 202-204 based upon the availability of the language interpretation/translation resources 106 in addition to user requirements provided in the UI data request received from the computing device 103. For example, the user requirements may include a scheduling availability for the user, a user preference for a particular modality, etc.

The indicia 202-204 may be displayed according to a variety of different shapes and formats. Further, the indicia 202-204 may be labeled with corresponding languages, e.g., German indicium 202, Spanish indicium 203, and French indicium 204. In various embodiments, the indicia 202, 203, and 204 are selectable by the user 102. Various input mechanisms may be utilized by the user 102 to select an indicium, e.g., touch screen input, pointer selection, etc.

The German indicium 202, Spanish indicium 203, and French indicium 204 are illustrated only as examples. Language availability may vary based upon the time that the user 102 sends a UI request, e.g., peak or off peak hours at the time of the request. For instance, more languages and corresponding modalities may be available during peak hours than off peak hours for providing language interpretation/translation services.

FIG. 2B illustrates another example in which the user 102 selects one of the language indicia 202-204 illustrated in FIG. 2A. For example, the user 102 selected the Spanish indicium 203. As a result, the computing device 103 either queries the routing engine 104 through the API 105 to obtain the available modalities for Spanish if Spanish is still available as a language for language interpretation/translation services. In other words, the computing device 103 not only obtains the current modalities for the selected language, but also obtains an update of the current languages from the routing engine 104. Therefore, the computing device 103 is able to update the display device 201 to reflect any changes to language resource availability that may have occurred during the time between the last UI data received and the current UI data that was received as a result of a user selection of a language indicium.

If resources for the selected language are still available, the computing device 103 receives and displays the corresponding modalities. In various embodiments, the selected indicium is transformed to display the available modalities. For example, the selected Spanish indicium 203 illustrated in FIG. 2A is transformed from illustrating a language label to the various modalities, e.g., Spanish video and Spanish audio. In various other embodiments, the appearance of the selected indicium is maintained, but an additional indicium, e.g., a pop up box, a drop down menu, etc. is displayed to provide the details of the available modalities. The displayed modalities may be selectable so that the user 102 may select a modality for the selected language to access the language interpretation/translation service.

In various other embodiments, a user selection a language indicium from language indicia 202-204 from FIG. 2A is not necessary for the routing engine 104 illustrated in FIG. 1 to send a UI data update to the computing device 103. For example, prior to the user 102 providing a selection of a language indicium, the routing engine 104 may have determined that a language interpreter/translator for an additional language has logged on to the language interpretation/translation platform 101. The routing engine 104 may then automatically send a UI data to the computing device 102, e.g., through a push notification, without the computing device 103 requesting an update from the routing engine 104. FIG. 2C illustrates an example of an additional language indicium 205 that is automatically received by the computing device 103 via a push notification from the routing engine 104. For example, during the browsing session of the user 102, an additional language became available, e.g., Portuguese, as a result of an additional language interpreter logging on to the language interpretation/translation platform 101 that provided language interpretation/translation services in a language not displayed by the language indicia 202-204 of FIG. 1. Thus, the computing device 103 displays the updated UI data to depict a Portuguese language indicium 105.

Similarly, language indicia may be automatically removed if language interpreters/translators log off of the language interpretation/translation platform 101 or begin work for another request. Thus, the routing engine 104 may also automatically send the computing device 103, e.g., via a push notification, updated UI data that does not include an indicium that is currently displayed by the computing device 103 so that the computing device 103 may re-render the UI data to reflect the most current available language resource data. For example, the French indicium 204 illustrated in FIG. 2A may be automatically removed prior to a user selection of a language indicium 202-204 if the routing engine 104 determines that the only available French language interpreter/translator has logged off of the language interpretation/translation platform 101 or otherwise become unavailable.

In various other embodiments, languages may be automatically added or removed from the UI displayed by the display device 201 even after a user provides a selection of a language indicium. For example, the routing engine 104 may determine after the user selection of the Spanish indicium 203 illustrated in FIG. 2B that the only French language interpreter/translator has logged off from the language interpretation/translation platform 101. The computing device 103 may then re-render the UI via the display device 201 to remove the French indicium 204 even after rendering the various modalities available for the Spanish indicium.

Further, in various other embodiments, modalities may be automatically added or removed from the UI displayed by the display device 201 even after a user provides a selection of a language indicium. For example, the routing engine 104 may determine after the user selection of the Spanish indicium 203 illustrated in FIG. 2B that a Spanish voice modality has become available. The computing device 103 may then re-render the UI via the display device 201 to display the Spanish voice modality in addition to the Spanish video and Spanish audio modalities.

After a user selects a particular modality, the computing device 103 may request the resource corresponding to the selected modality and language for the user 102 from the language interpretation/translation resources 106 through the routing engine 104 via a call to the API 105. In various embodiments, the computing device 103 may also display additional information associated with the selected modality for the selected language prior to, during, or subsequent to the user 102 ordering the particular resource. For instance, wait time may be displayed by the display device 201. The wait time may be determined based upon resource availability, user schedule, etc.

Figure 3:
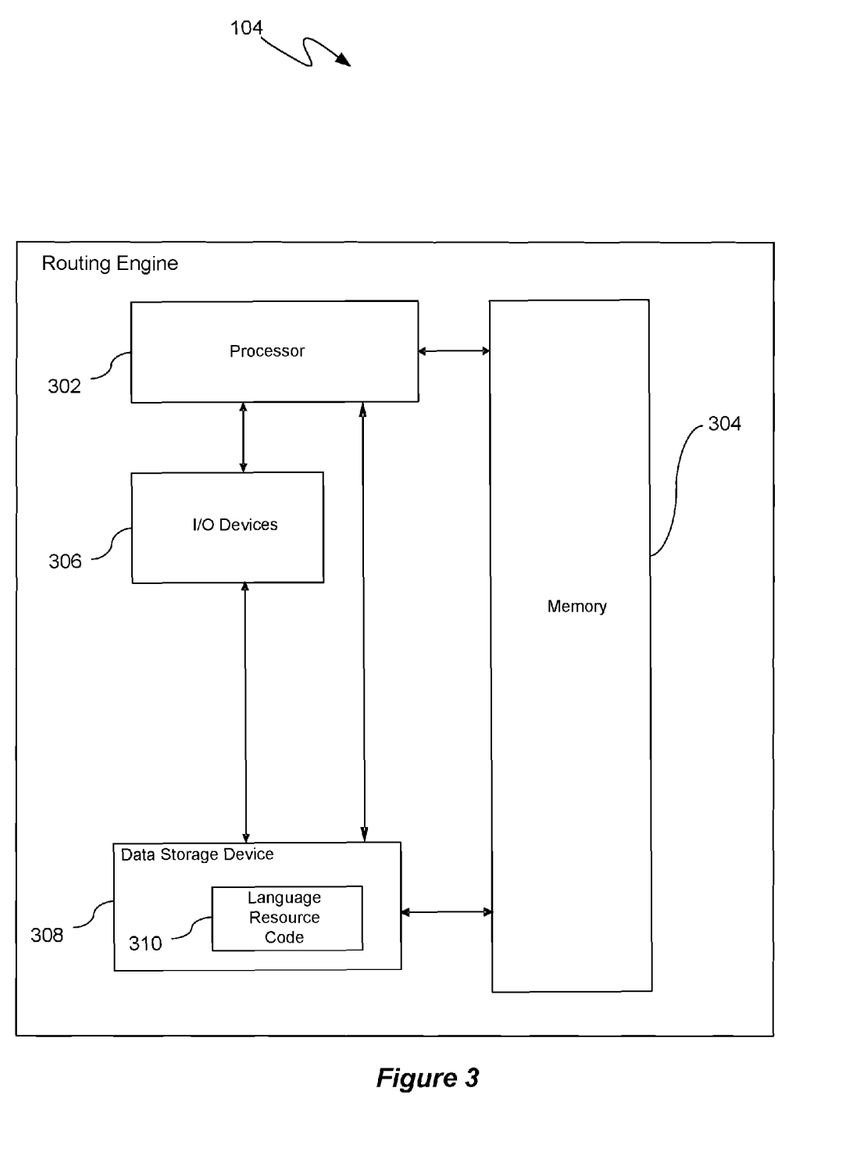
FIG. 3 illustrates the internal components of the routing engine illustrated in FIG. 1.

FIG. 3 illustrates the internal components of the routing engine 104 illustrated in FIG. 1. In one embodiment, the routing engine 104 is implemented utilizing a general purpose computer or any other hardware equivalents. Thus, the routing engine 104 comprises a processor 302, a memory 304, e.g., random access memory ("RAM") and/or read only memory (ROM), various input/output devices 306, e.g., a receiver, a transmitter, a user input device, a speaker, an image capture device, an audio capture device, etc., a data storage device 308, and language resource code 310 stored on the data storage device 308. The language resource code 310 is utilized by the processor 302 to determine the availability of various language interpretation/translation resources 106, e.g., determination of whether or not a resource is online, working on another project, etc.

The language resource code 310 may be represented by one or more software applications or a combination of software and hardware, e.g., using application specific integrated circuits ("ASIC"), where the software is loaded from a storage device such as a magnetic or optical drive, diskette, or non-volatile memory and operated by the processor 302 in the memory 304 of the computer. As such, the language resource code 310 and associated data structures may be stored on a computer readable medium such as a computer readable storage device, e.g., RAM memory, magnetic or optical drive or diskette, etc. The routing engine 104 may be utilized for a hardware implementation of any of the configurations provided herein.

Figure 4:
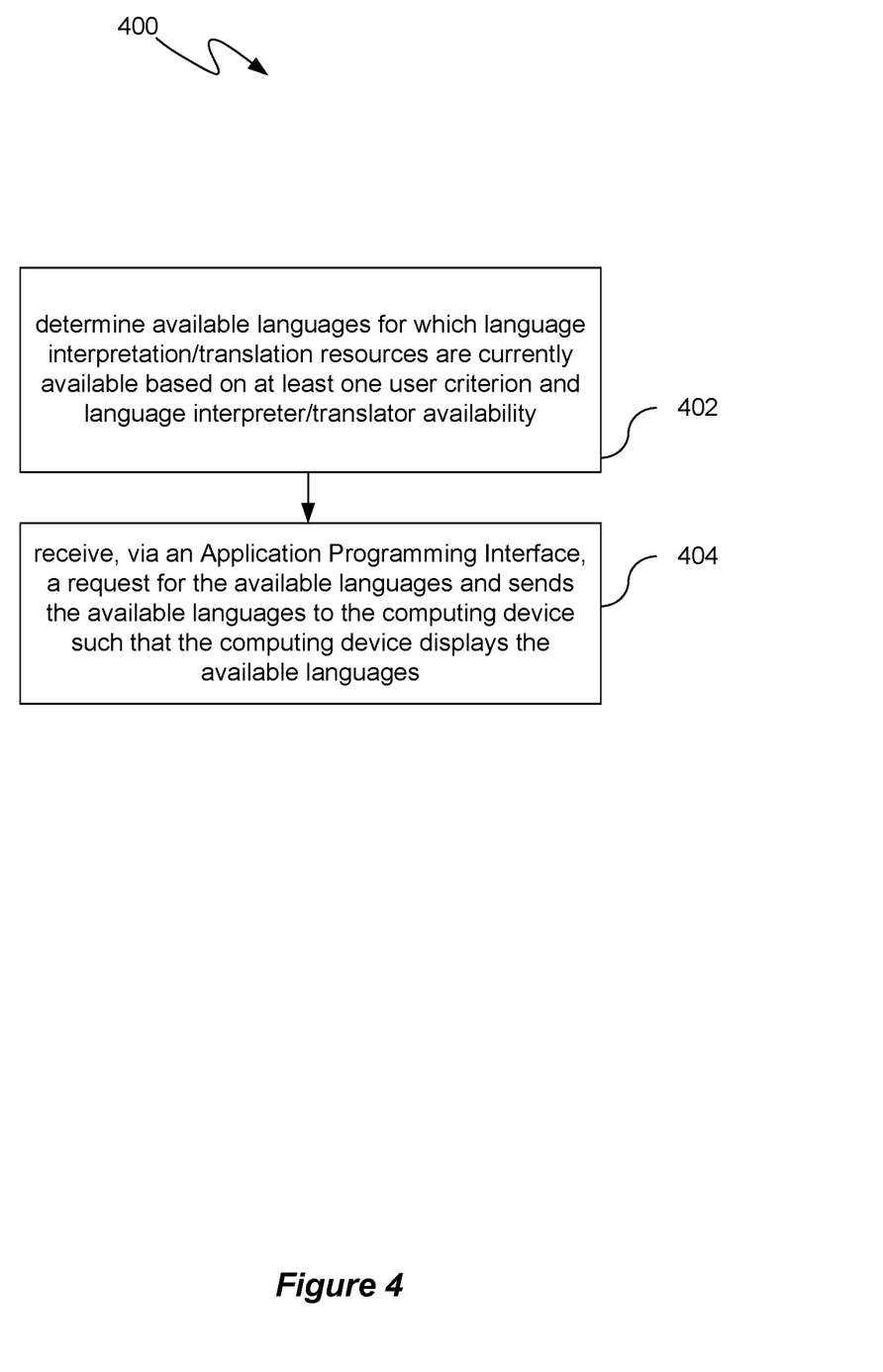
FIG. 4 illustrates a process that may be utilized to dynamically update a User Interface ("UI") based on language interpreter/translator availability.

FIG. 4 illustrates a process 400 that may be utilized to dynamically update a UI based on language interpreter/translator availability. At a process block 402, the process 400 determines available languages for which language interpretation/translation resources are currently available based on at least one user criterion and language interpreter/translator availability. Further, at a process block 404, the process 400 receives, via an API, a request for the available languages and sends the available languages to the computing device such that the computing device displays the available languages. The request includes the at least one user criterion.

In various embodiments, the dynamic updating may be performed in real-time. In various other embodiments, the dynamic updated may be performed in substantially real-time.

Further, the routing engine 104 may utilize a predictive engine to attempt to predict resources that the user 102 may want to request at a particular time based on previous requests, e.g., previous requests by the user 102 on particular days and/or times. The routing engine 104 may then automatically route a communication from the user 102 at such days and/or times to the predicted resource.

In addition, the routing engine 104 may perform price adjustments to particular resources based on high demand from multiple users. For example, a modality for a particular language may be in high demand during peak hours for language interpretation/translation requests. The routing engine may adjust the price of such resources for such demand.

The UI is dynamically updated according to a particular user 102. In other words, different users 102 may have different types of dynamic updating based on different criteria. For example, at least one criterion in addition to resource availability may be utilized to determine if a dynamic update is to be performed. For instance, the at least one criterion may be a user scheduling preference, a user product preference, a device specific preference, etc. The user product preference may be a particular preference such as video rather than audio. Further, the device specific preference may be a preference based on device compatibility, e.g., a particular computing device 103 may operate more effectively with a particular modality than another modality, network bandwidth, etc.

The processes described herein may be implemented in a specialized processor that is specifically configured to dynamically update a UI. Alternatively, such processes may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium such as a computer readable storage device. The instructions may also be created using source code or any other known computer-aided design tool. A computer readable medium may be any medium capable of storing those instructions and include a CD-ROM, DVD, magnetic or other optical disc, tape, silicon memory, e.g., removable, non-removable, volatile or non-volatile, etc.

A computer is herein intended to include any device that has a general, multi-purpose or single purpose processor as described above. For example, a computer may be a PC, laptop computer, set top box, cell phone, smartphone, tablet device, portable media player, video player, etc.

It is understood that the computer program products, apparatuses, systems, and processes described herein may also be applied in other types of apparatuses, systems, and processes. Those skilled in the art will appreciate that the various adaptations and modifications of the embodiments of the compute program products, apparatuses, systems, and processes described herein may be configured without departing from the scope and spirit of the present computer program products, apparatuses, systems, and processes. Therefore, it is to be understood that, within the scope of the appended claims, the present computer program products, apparatuses, systems, and processes may be practiced other than as specifically described herein.

We claim:

1. A computer implemented language interpretation platform, for providing a language interpretation session between a user and a human staff language interpreter, comprising:
   a processor that determines available languages for which language interpretation resources are currently available based on at least one user criterion and language interpreter availability,
      wherein the processor also determines available modalities for the available languages,
      wherein the available modalities are selected from the group consisting of: voice, text, and video; and
   a routing engine that receives, via an Application Programming Interface, a request, from a computing device being used by the user, for the available languages and sends the available languages and the available modalities to the computing device such that the computing device displays the available languages and,
      after receiving a user selection of one of the available languages, displays the available modalities for the user selected language and receives a user selection of one of the available modalities for establishing a language interpretation session with a language interpreter for the user selected language,
      wherein the request includes the at least one user criterion,
      the routing engine further sending a real-time update of the available modalities to the computing device prior to a user selection of one of the available modalities such that the computing device changes the available modalities that are displayed based on the real-time update,
      the real-time update being based on a change in the modality availability.

2. The computer implemented language interpretation platform of claim 1, wherein the routing engine sends a real-time update of the available modalities to the computing device after the user selection of the user selected language.

3. The computer implemented language interpretation platform of claim 1, wherein the routing engine sends a real-time update of the available modalities to the computing device after the user selection of a modality from the available modalities so that the computing device displays the updated available modalities.

4. The computer implemented language interpretation platform of claim 1, wherein the routing engine sends a real-time update to the available languages after the user selection of the user selected language.

5. The computer implemented language interpretation platform of claim 1, wherein the routing engine automatically sends a real-time update to the available languages without the user selection of the user selected language.

6. The computer implemented language interpretation platform of claim 1, wherein the routing engine sends an update to the available languages after the user selection of the user selected language.

7. The computer implemented language interpretation platform of claim 1, wherein the at least one user criterion is a user scheduling preference.

8. The computer implemented language interpretation platform of claim 1, wherein the at least one user criterion is a user specific product preference.

9. The computer implemented language interpretation platform of claim 1, wherein the processor also determines the available languages for which the language interpretation/translation resources are currently available based on device specific preferences.

10. The computer implemented language interpretation platform of claim 1, wherein the routing engine sends a wait time for a modality associated with a language from the available languages.

11. The computer implemented language interpretation platform of claim 1, wherein the processor determines a time for the routing engine to automatically route a communication from the user to a language interpreter based on one or more prior requests.

12. The computer implemented language interpretation platform of claim 1, wherein the processor adjusts a price associated with the user selected language based upon an increased demand from multiple users.

13. A computer program product comprising a non-transitory computer readable storage device having a computer readable program stored thereon, wherein the computer readable program when executed on a server computer causes the server computer to:
   determine available languages for which language interpretation resources are currently available based on at least one user criterion and language interpreter availability, wherein the language interpretation resources are human staff interpreters;
   determine available modalities for the available languages, wherein the available modalities are selected from a group consisting of: voice, text, and video;
   receive, via an Application Programming Interface, a request, from a computing device being used by a user, for the available languages;
   send, via the Application Programming Interface, the available languages and the available modalities to the computing device such that the computing device displays the available languages and, after receiving a user selection of one of the available languages, displays the available modalities for the user selected language and receives a user selection of one of the available modalities for establishing a language interpretation session with a language interpreter for the user selected language, wherein the request includes the at least one user criterion; and
   send, via the Application Programming Interface, a real-time update of the available languages to the computing device prior to the user selection of the user selected language such that the computing device changes the available languages that are displayed based on the real-time update,
   the real-time update being based on a change in the language interpreter availability.

14. The computer program product of claim 13, wherein the computer readable program when executed on the server computer also causes the server computer to send a real-time update of the available modalities to the computing device after the user selection of the user selected language.

15. The computer program product of claim 13, wherein the computer readable program when executed on the server computer also causes the server computer to send a real-time update of the available modalities to the computing device after the user selection of the user selected language.

16. The computer program product of claim 13, wherein the computer readable program when executed on the server computer also causes the server computer to send a real-time update to the available languages after the user selection of the user selected language.

* * * * *